F. SIMPSON.
APPARATUS FOR INDICATING AND RECORDING SMALL DIFFERENCES OF FLUID PRESSURE AND FOR OPERATING INTEGRATING OR CONTROL DEVICES WHICH HAVE TO BE REGULATED BY THE SAID DIFFERENCES OF PRESSURE.
APPLICATION FILED MAY 17, 1913.
1,132,400. Patented Mar. 16, 1915.
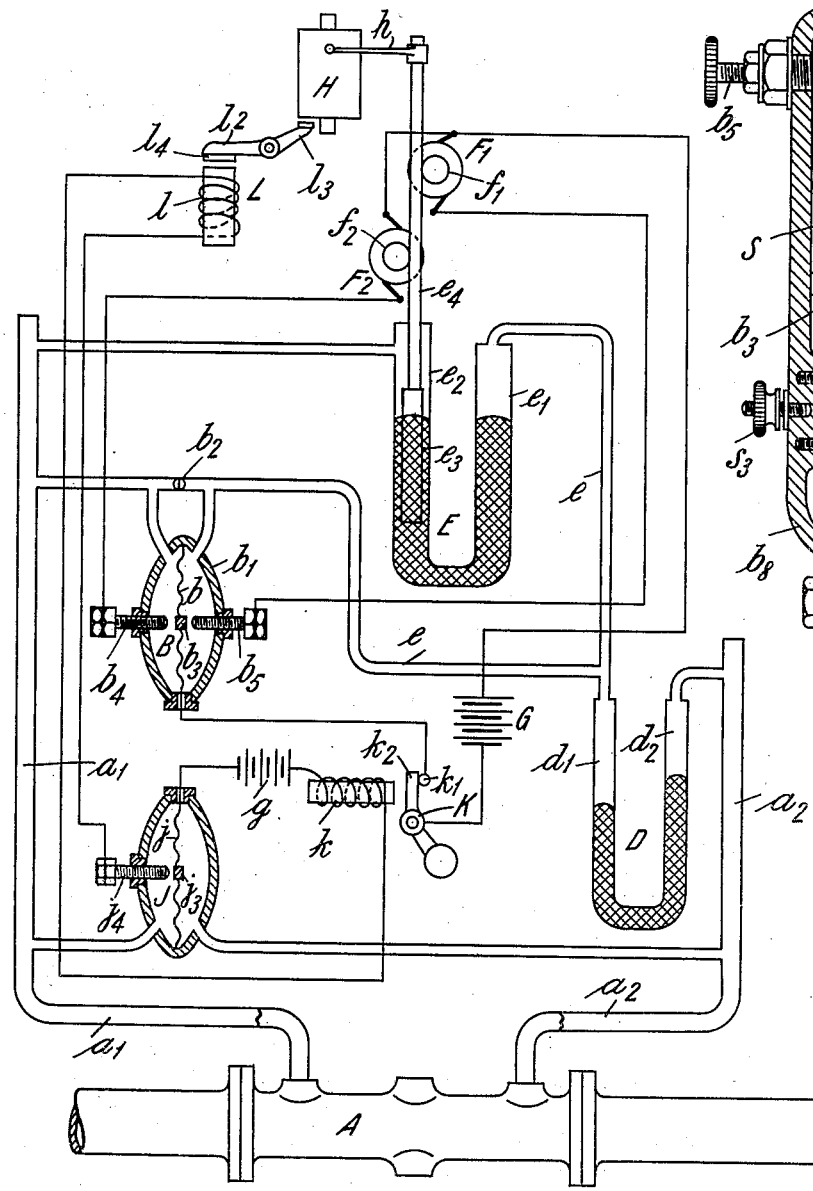
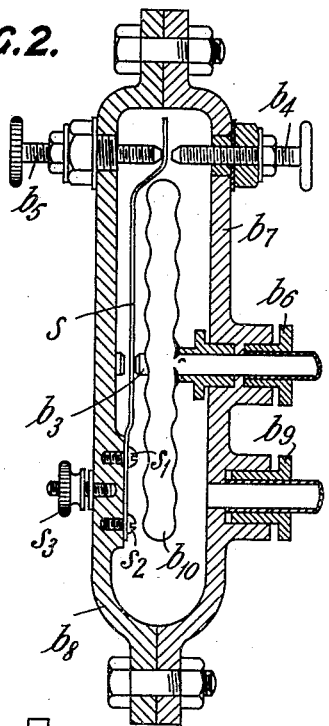

UNITED STATES PATENT OFFICE.

FRED SIMPSON, OF BLUNDELLSANDS, NEAR LIVERPOOL, ENGLAND.

APPARATUS FOR INDICATING AND RECORDING SMALL DIFFERENCES OF FLUID-PRESSURE AND FOR OPERATING INTEGRATING OR CONTROL DEVICES WHICH HAVE TO BE REGULATED BY THE SAID DIFFERENCES OF PRESSURE.

1,132,400.   Specification of Letters Patent.   Patented Mar. 16, 1915.

Application filed May 17, 1913. Serial No. 768,388.

*To all whom it may concern:*

Be it known that I, FRED SIMPSON, a subject of the King of Great Britain, and residing in Blundellsands, near Liverpool, England, have invented certain new and useful improvements in apparatus for indicating and recording small differences of fluid-pressure and for operating integrating or control devices which have to be regulated by the said differences of pressure, of which the following is a specification.

This invention relates to apparatus for indicating and recording small differences of fluid pressure, such for example as the difference of pressure in the measuring tubes of a Venturi water meter or the like, and for operating integrating devices, such for example as those employed to measure the volume of water flowing in relation to time, or for controlling devices such as would be employed to insure a definite flow or to regulate the flow in accordance with the variation of pressure difference.

The invention is illustrated in the accompanying drawings in which—

Figure 1 is a diagrammatic view of an arrangement which may be adopted; Fig. 2 is a sectional view showing details of construction of the relay gage.

In carrying out the invention, and with reference to Fig. 1, I place across the two parts, say, the measuring tubes $a^1$ and $a^2$ of a water meter A between which the difference of pressure has to be indicated, recorded. or utilized for operating the control device, two gages B and D in series; for convenience of description the gage B will be referred to as the relay gage and D as the indicator gage. The indicator gage may be a differential column of fluid, elastic diaphragm or other suitable type which when subject to the difference of pressure to be measured will take up a balancing position consequent upon a volume displacement proportional to the said difference of pressure; I have shown a U tube containing a liquid having a specific gravity different from that of the fluid in the tubes $a^1$ and $a^2$; in this case one of the limbs $d^2$ of the U tube would be connected to one of the latter tubes $a^2$, the other limb $d^1$ being connected by a suitable charged tube $e$, which will be referred to as the equalizer section, to one side of the relay gage B, the other side of which is connected to the tube $a^1$.

The relay gage B may consist of any suitable and very sensitive form of displacement gage, say a thin elastic diaphragm $b$ mounted in the casing $b^1$. The relay gage must cut off the fluid on the one side of it from that on the other side, so as to isolate the fluid in the equalizer section $e$ between the relay B and the indicator D; and for calibrating the indicator D and zero setting purpose a free passage for the fluid is obtained by means of a cock $b^2$.

An equalizer device E is fitted, one side of which communicates with the equalizer section $e$, and the other side of which communicates with the tube $a^1$; this device is operated by any suitable motive power and is adapted to supply further fluid to or withdraw fluid from the equalizer section. In Fig. 1 the equalizer E is shown as being operated by electric motors $F^1$ and $F^2$. The diaphragm of the relay B has mounted on it a contact piece $b^3$ connected to one pole of a battery G, and contact screws $b^4$ connected to one pole of the motor $F^2$, and $b^5$ connected to the one pole of the motor $F^1$ are provided, and other poles of the two motors are connected to the remaining pole of the battery G; the movement of the diaphragm thus controls the supply and duration of electric energy from the battery G to the motors $F^1$ and $F^2$ respectively.

A suitable equalizer may consist of a mercury U tube, one limb $e^1$ of which is connected to the equalizer section $e$, and the other limb $e^2$ containing the power operated displacer $e^3$ and being connected to the tube $a^1$ so as to maintain a pressure on the surface of the mercury in the limb $e^2$ equal to that in the tube $a^1$.

In order to avoid friction the displacer $e^3$ is operated by a slender piston rod $e^4$ passing through a suitable stuffing box, shown diagrammatically at $e^5$, and operated by motors $F^1$ and $F^2$. In Fig. 1 the motors $F^1$ and $F^2$ are shown provided with pinions $f^1$ and $f^2$ which gear directly with the piston rod $e^4$, but in practice any suitable means of operating the displacer may be used. The movement of the displacer is recorded by suitable means on a recording drum; in Fig. 1 I have shown the upper end of the piston rod $e^4$ carrying a pencil arm $h$ moving over the drum H.

When working the apparatus it is found convenient, especially when the difference of pressure to be measured is of a pulsating nature, say that due to a pump discharge, to provide means for stopping the recording drum and making the displacer mechanism inoperative. To carry this out I connect a second relay gage J, the construction of which is substantially the same as that of the relay gage B, across the tubes $a^1$ and $a^2$ of the water meter A.

The diaphragm $j$ of the relay gage J is provided with a contact piece $j^3$ and connected electrically to one pole of the battery $g^1$. As the gage has to operate only when the difference of pressure is zero, one contact screw $j^4$ only is required which is connected through the solenoids $l$ and $k$ to the remaining pole of the battery $g$. When the pressures in the tubes $a^1$ and $a^3$ become equal, the diaphragm $j$ is so arranged that contact is made between the contact piece $j^3$ and the contact screw $j^4$, thus completing the circuit and energizing the solenoids $l$ and $k$. On $k$ being energized the arm $k^2$ of the switch K is pulled clear of the terminal $k^1$, thus cutting off the motive power to the motors $F^1$ and $F^2$ and rendering the displacer mechanism inoperative. On $l$ being energized the armature $l^4$ on the arm $l^2$ of the braking device L is attracted, causing the brake $l^3$ to be applied to the recording drum H and thus preventing further records being taken until the difference of pressure is restored, which difference of pressure acting on the diaphragm causes the circuit to be broken at $j^3$, allowing switch K to again complete the main circuit and the drum H to rotate freely.

In actual practice it is found convenient to construct the relay gages as shown in Fig. 2 in which the diaphragm takes the form of a collapsible cylinder $b^{10}$ similar in construction to those used in aneroid barometers. The inside of the cylinder is connected through a gland joint $b^6$ by a pipe to the one side of the pressure system, and the interior of the casing which in this case is made in halves $b^7$ and $b^8$ is connected by a gland joint $b^9$ to the other side of the pressure system.

The cylinder $b^{10}$ is provided with a contact piece $b^3$ with which the spring $s$ secured by screws $s^1$ and $s^2$ to the half $b^8$ of the casing is always in contact. A difference of pressure between the interior and exterior of the cylinder causes the contact piece $b^3$ to move the spring $s$ into contact with either of the contact screws $b^4$ or $b^5$ mounted on and insulated from the casing as shown; the circuit to the motors $F^1$ and $F^2$ is completed at the terminal $s^3$ on the half $b^8$ of the casing.

In actual practice it may be more convenient to make the equalizer E of concentric tubes; the inner tube or casing being provided with the displacer and communicating with the tube $a^1$ of the system; the outer tube or casing communicating with the equalizer section $e$.

The meter A used in connection with the apparatus is preferably of the type described in the specifications to British Letters Patents Nos. 21769 of 1909 and 7249 of 1910, granted to myself and another.

The action of the apparatus is as follows: Assuming the apparatus to be in zero adjustment, flow of fluid through the meter A will cause the pressure in $a^1$ to be greater than the pressure in $a^2$. The difference of pressure will move the diaphragm $b$ of the relay gage B over, and will also cause a difference in level in the fluid in the limbs $d^1$ and $d^2$ of the indicator gage D. This difference of level is not a true indication of the difference of pressure in tubes $a^1$ and $a^2$, as the pressure in the equalizer section $e$ is limited by the movement of the diaphragm $b$ and is a pressure intermediate in value between the pressures in tubes $a^1$ and $a^2$. The levels of the liquid in E are also disturbed, the level of the liquid in limb $e^1$ is higher than that in limb $e^2$.

On the diaphragm being pushed over, contact is made between $b^3$ and $b^5$; the motor $F^1$ is thus connected across the battery G, and commences to push the displacer $e^3$ down, raising the level of the liquid in both limbs $e^2$ and $e^1$, but at a great rate in limb $e^2$, and thus increases the pressure in the equalizer section $e$. The motor $F^1$ continues to push the displacer down until the pressure in the equalizer section $e$ is equal to the pressure in the tube $a^1$, when the circuit to the motor is broken by the diaphragm moving back to its normal position. The pressure in the equalizer section $e^1$ being now equal to the pressure in $a^1$, the difference in levels of the indicator D will give a true indication of the difference of pressure of fluid in the tubes $a^1$ and $a^2$. If the pressure in $a^1$ should be less than in $a^2$, the action is similar, the diaphragm $b$ moves over until contact is made between $b^4$ and $b^3$; thus the battery is put across the motor $F^2$ which pulls up the displacer $e^3$ until the pressure in the equalizer section $e$ is equal to pressure in $a^1$. The position of the displacer is recorded on the drum H at all times except when the pressure in $a^1$ is equal to the pressure in $a^2$, and the second relay J comes into action, stopping the drum H and opening the main circuit at K.

It will be seen that the position of the displacer $e^3$ is a function of the difference of the pressures in the tubes $a^1$ and $a^2$, and means may be taken by which the displacer is made to operate integrating and control devices. When the power required to operate the integrating or control device is great, say in the case of a sluice valve control, the motors $F^1$ and $F^2$ being positively geared to the displacer may be used.

In the drawings the piston rod is utilized to directly mark a diagram, but it may be arranged to do so through any suitable device to enlarge, reduce or modify the proportion of the diagram, and (or) to actuate any device for integrating, (as for example the integrator described in the complete specification of British Patent application No. 28783 of 1911) or controlling the quantity of fluid passing.

In some cases the equalizer may consist simply of a displacer working in a chamber directly connected to the tube $e$; but the arrangement described has the advantage that the effect of leakage at the gland is minimized. The relay may be operated by other than electrical means.

Although in describing the apparatus I have referred to its application to a water meter, it is to be understood that it is generally applicable for measuring small differences of pressure or for utilizing such differences to control the operation of other apparatus, and that while it is particularly applicable for the measurement of small pressure differences, it is suitable for measuring such differences when the absolute pressures are considerable.

Having now fully described my invention I declare that what I claim and desire to secure by Letters Patent is:—

1. Apparatus actuated by small differences of pressure, consisting of a displacement gage one side of which is connected to one of the fluids the pressure of which is to be measured; a second displacement gage one side of which is connected to the other fluid the pressure of which is to be measured; an inclosed space connecting the remaining two sides of the displacement gages together and containing a fluid which is isolated from the pressures to be measured; a device for varying the pressure of the said isolated fluid; and means controlled by the movement of one of the said gages for operating the said device; substantially as described.

2. Apparatus actuated by small differences of pressure, consisting of a displacement gage one side of which is connected to one of the fluids the pressure of which is to be measured; a second displacement gage one side of which is connected to the other fluid the pressure of which is to be measured; an inclosed space connecting the remaining two sides of the displacement gages together and containing a fluid which is isolated from the pressures to be measured; a device for varying the pressure of the said isolated fluid; means controlled by the movement of one of the said gages for operating the said device; and a third displacement gage the opposite sides of which are connected to the fluid pressures to be measured, the movement of said gage being adapted to cut out of action the means for operating the controlling device, substantially as described.

3. Apparatus for indicating, recording and utilizing for control purposes small differences of pressure, consisting of a displacement gage one side of which is connected to one of the fluids the pressure of which is to be measured; a second displacement gage one side of which is connected to the other fluid the pressure of which is to be measured; an inclosed space connecting the remaining two sides of the displacement gages together and containing a fluid which is isolated from the pressures to be measured; a device for varying the pressure of the said isolated fluid; means controlled by the movement of one of the said gages for imparting movement to the operative part of the controlling device, and indicating, recording and controlling means operated by the said moving part, substantially as described.

4. Apparatus for indicating, recording and utilizing for control purposes small differences of pressure, consisting of a displacement gage one side of which is connected to one of the fluids the pressure of which is to be measured; a second displacement gage one side of which is connected to the other fluid the pressure of which is to be measured; an inclosed space connecting the remaining two sides of the displacement gages together and containing a fluid which is isolated from the pressures to be measured; a device for varying the pressure of the said isolated fluid; means controlled by the movement of one of the said gages for imparting movement to the operative part of the controlling device; indicating, recording and controlling means operated by the said moving part; and a third displacement gage the opposite sides of which are respectively connected to the fluid the pressure of which has to be measured, and the movement of which is adapted to cut out of action the means for operating the controlling device and the indicating, recording and controlling devices; substantially as described.

5. Apparatus actuated by small differences of pressure, consisting of a displacement gage one side of which is connected to one of the fluids the pressure of which is to be measured; a second displacement gage one side of which is connected to the other fluid the pressure of which is to be measured; an inclosed space connecting the remaining two sides of the displacement gages together and containing a fluid which is isolated from the pressures to be measured; a device for varying the pressure of the said isolated fluid; an electrically controlled organization for actuating the said device; and means controlled by the moving part of one of the said gages for controlling the supply of current to the said organization, substantially as described.

6. In apparatus for indicating, recording and utilizing for control purposes, a relay displacement gage one side of which is connected to one of the fluid pressures to be measured; a second displacement gage one side of which is connected to the other pressure to be measured; an inclosed space connecting the remaining two sides of the displacement gages together and containing a fluid which is isolated from the pressures to be measured; a device for varying the pressure of the said isolated fluid; electrical means for operating the said device; an electrical contact actuated by the moving part of the relay gage; two fixed but adjustable contacts mounted on either side of the said moving contact; a source of potential, one pole of which is connected to the said moving contact; an electrical organization connected between the other pole of the said source of potential and one of the said terminals and adapted when its circuit is closed to actuate the pressure varying device operating means so as to increase the pressure of the isolated fluid; and a second electrical organization connected from the last mentioned pole of the source of potential to the other adjustable contact and adapted when its circuit is closed to operate the equalizer so as to reduce the pressure of the said isolated fluid, substantially as described.

7. Apparatus actuated by small differences of pressure, consisting of a displacement gage one side of which is connected to one of the fluids the pressure of which is to be measured; a second displacement gage one side of which is connected to the other fluid the pressure of which is to be measured; an inclosed space connecting the remaining two sides of the displacement gages together and containing a fluid which is isolated from the pressures to be measured; a closed U tube containing a liquid, one leg of which is connected to one of the fluids the pressure of which is to be measured and the other leg of which is connected to the said inclosed space; a displacing plunger working fluid-tight in one of the legs of the said U tube; and an organization for imparting movement to the said displacing plunger and controlled by the movement of the displacement gage connected to the said fluid; substantially as described.

8. Apparatus actuated by small differences of pressure, consisting of a displacement gage one side of which is connected to one of the fluids the pressure of which is to be measured; a second displacement gage one side of which is connected to the other fluid the pressure of which is to be measured; an inclosed space connecting the remaining two sides of the displacement gages together and containing a fluid which is isolated from the pressures to be measured; a device for varying the pressure of the said isolated fluid; an electrically controlled organization for actuating the said device; means controlled by the moving part of one of the said gages for controlling the supply of current to the said organization; and a third displacement gage the opposite sides of which are respectively connected to the said fluids; and an electrical organization controlled by the movement of the said gage and adapted to render the first mentioned organization inoperative; substantially as described.

9. In apparatus actuated by small differences of pressure, in combination with the two displacement gages connected in series across the pressures to be measured, the displacer; the means for operating the displacer; the electrical organization for controlling said means; and the indicating device actuated by the displacer,—a third displacement gage; an electrical contact actuated by the moving part of the said gage; a fixed but adjustable contact interposed in the path of the said moving contact; a source of potential; an electro-magnet mechanism connected in series with said moving and fixed contacts; and means operated by the said electro-magnetic mechanism for arresting the movement of the recording device, substantially as described.

10. In apparatus actuated by small differences of pressure, and in combination with the displacement gage one side of which is connected to one of the fluids the pressure of which is to be measured and the other side of which is connected to an inclosed space, a device for varying the pressure in the said inclosed space, means for operating the said device and a displacement gage having a flexible diaphragm subjected on the one side to the pressure in said inclosed space and on the other side to the pressure to be measured,—an electrical contact connected to the said diaphragm and a fixed but adjustable contact; and an electrical organization controlled by said contacts adapted to control the means for operating the pressure varying device, substantially as described.

In testimony whereof I affix my signature in presence of two witnesses.

FRED SIMPSON.

Witnesses:
D. LLOYD BARNES,
JOSEPH E. HIRST.